(12) United States Patent
Grenga

(10) Patent No.: US 11,884,396 B1
(45) Date of Patent: Jan. 30, 2024

(54) RAPID RELEASE INTERFACE FOR AIRDROP LASHINGS

(71) Applicant: U.S. Government as Represented by the Secretary of the Army, Natick, MA (US)

(72) Inventor: Todd M Grenga, Cumberland, RI (US)

(73) Assignee: U.S. Government as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/121,831

(22) Filed: Dec. 15, 2020

(51) Int. Cl.
*B64D 1/10* (2006.01)
*B60P 7/08* (2006.01)

(52) U.S. Cl.
CPC .............. *B64D 1/10* (2013.01); *B60P 7/0823* (2013.01); *Y10T 24/4773* (2015.01)

(58) Field of Classification Search
CPC ............. B64D 1/10; B60P 7/0823; B60P 7/14
USPC .......... 410/96, 119, 118, 121–126, 128, 154; 294/68.1
See application file for complete search history.

(56) References Cited

U.S. PATENT DOCUMENTS

| | | | |
|---|---|---|---|
| 5,288,187 A | 2/1994 | Ward | |
| 6,957,938 B1 | 10/2005 | Beasley | |
| 7,887,011 B1 | 2/2011 | Baldwin | |
| 10,427,788 B1 | 10/2019 | Grenga | |
| 2012/0025027 A1 | 2/2012 | Yandle et al. | |

*Primary Examiner* — D Glenn Dayoan
*Assistant Examiner* — Sunsurraye Westbrook
(74) *Attorney, Agent, or Firm* — Timothy M. Barlow

(57) ABSTRACT

An apparatus for rigging and derigging lashings of an airdrop platform with one action includes a rapid release interface assembly. A loop member replaces the D-ring at the one end of a lashing. The rapid release interface system is installed in the space between the platform side rail and panel end members. Pins will slide through the lashing loop members to secure the end of the lashing to the rapid release interface system. With all of the pins on a common drive, the pins are all opened and closed together, or at the same time. In this manner, the one end of the lashing can be secured or released with one action making it faster and easier to derig a payload from an airdrop platform.

13 Claims, 9 Drawing Sheets

RAPID RELEASE INTERFACE FOR AIRDROP LASHINGS

STATEMENT OF GOVERNMENT INTEREST

The invention described herein may be manufactured and used by the United States Government for governmental purposes without the payment of any royalty thereon.

BACKGROUND

1. Field

The aspects of the disclosed embodiments generally relate to lashings for airdrop platforms and in particular to an interface to allow rapid release of multiple lashings from an airdrop platform with a single action.

2. Description of the Prior Art

For military style heavy drop or cargo drop, the cargo is typically positioned on a Type V platform. The cargo or payload is positioned on paper honeycomb. The payload is secured to the platform with tie downs, also referred to herein as lashings. The typical rigging of such lashings is to loop them back on themselves. Each end of the lashing will have a "D" style ring, or D-ring, on end of the lashing; one end is sewn on and the other is held in place due to friction. An end of the lashing is routed through a piece of equipment on the platform (a clevis), through a securing ring or tiedown on the payload itself, and then back to be joined with the other end of the lashing. A load binder is used to cinch the two D-rings together, one at each end of the lashing, to form a continuous loop.

In a typical airdrop platform, such as the Type V airdrop platform, generally referred to as a platform herein, the lashings connect to a clevis on a bushing. The bushing sits between a side rail and end member of the platform. The typical airdrop platform is made up of 2-foot panels, and on each 2-foot panel there are four (4) bushings per side. As an example, with an 8-foot platform, there are sixteen (16) bushings per side.

One of the longer processes in removing an item from an airdrop platform is the removal of the lashings. With D-rings at both ends of the lashings, when the load binder is released, it is possible that the lashing will not be able to pull free. The D-rings will not slip through or pull free of the clevis or tiedown point. The D-ring may need to be removed to get the lashing out to be able to remove the payload from the platform, which can take considerable time. In non-training events, lashings might be cut in order to quickly release the payload. This results in great waste and expense.

Accordingly, there is a need for an improved lashing apparatus for securing and releasing a payload to and from an airdrop platform.

SUMMARY

According to a first aspect the above and further objects and advantages are obtained by an apparatus. In one embodiment, the apparatus includes an airdrop platform and a rapid release interface assembly. The rapid release interface assembly is secured in a channel along a side of the airdrop platform. The rapid release interface assembly includes a movable pin member that is configured to move between an extended position and a retracted position. A lashing configured to tie down a payload to the airdrop platform has one end with a loop member. The movable pin member is configured to engage the loop member in the extended position and release the loop member when in the retracted position.

The aspects of the disclosed embodiments provide a system that allows for derigging lashings of an airdrop platform with one action. The use of the Type V platform devises and the sewn in D-ring from one end of a lashing is eliminated. A loop member replaces the D-ring at the one end of the lashing. A rapid release interface system is installed in the space between the platform side rail and panel end members. The pins will slide through the lashing loop members to secure the end of the lashing to the rapid release interface system. With all of the pins on a common drive, the pins are all opened and closed together, or at the same time. In this manner, the one end of the lashing can be secured or released with one action.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DESCRIPTION OF THE PREFERRED EMBODIMENTS

Figure 1:
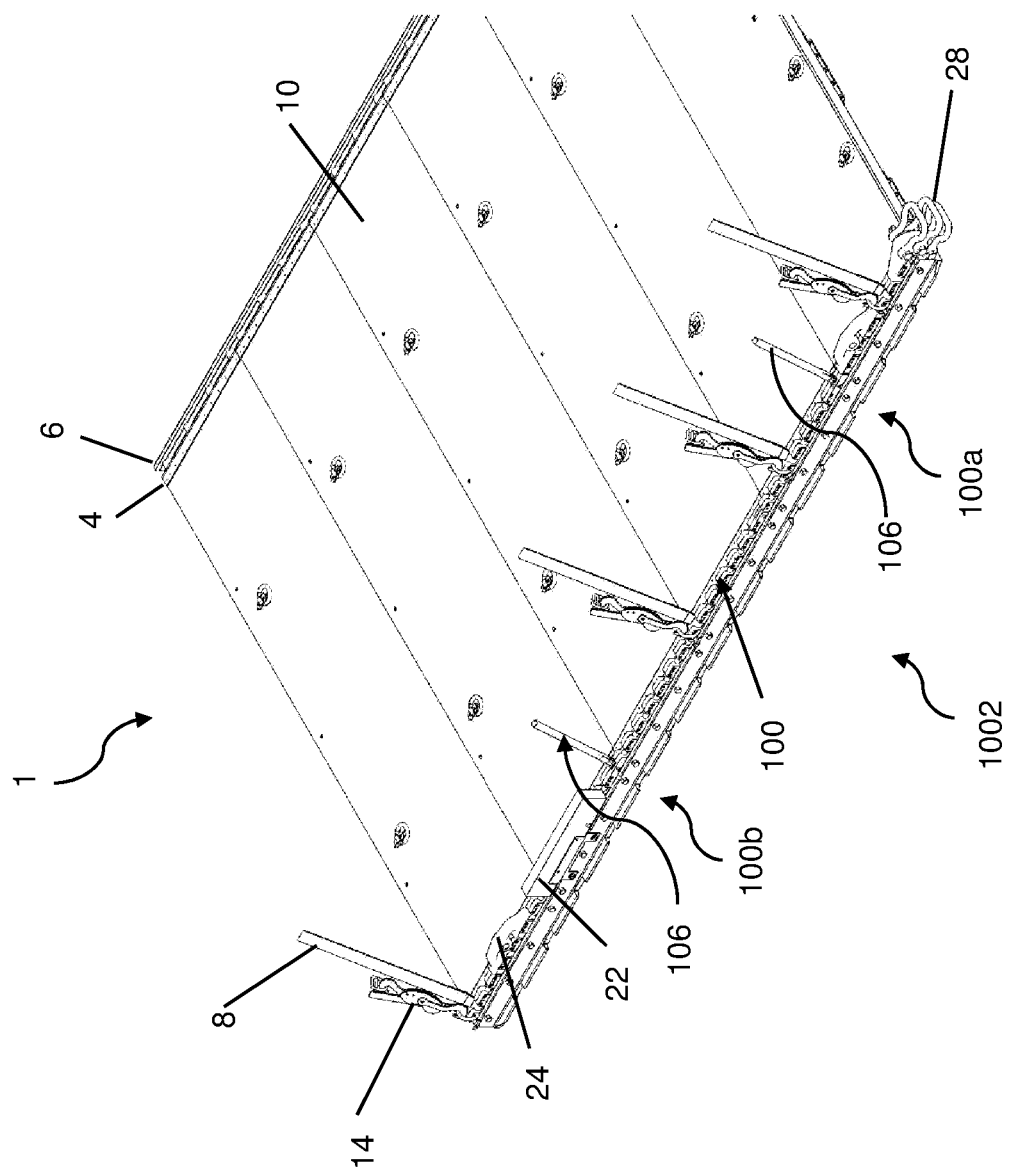
FIG. 1 is an illustration of an exemplary rapid release interface assembly incorporating aspects of the disclosed embodiments installed on a Type 5 Airdrop Platform assembly.

The aspects of the disclosed embodiments are directed to a rapid release interface assembly for airdrop lashings. FIG. 1 illustrates an exemplary airdrop platform 10 that includes a rapid release interface assembly 100 incorporating aspects of the disclosed embodiments. The rapid release interface assembly 100 is configured to enable multiple lashings or lash members 8, used to secure a payload (not shown) to the airdrop platform 10, to be released or freed from the platform 10 with a single action. Also referred to as a rapid release interface assembly or Quick Interface for Lashing (QuIL), the rapid release interface assembly 100 is configured to replace the bushing and clevis arrangement that is typically used in an airdrop platform application. In the example of FIG. 1, the airdrop platform is a Type V Platform assembly. In alternate embodiments, the rapid release interface assembly 100 is configured to be disposed in connection with any suitable airdrop platform.

Figure 2:
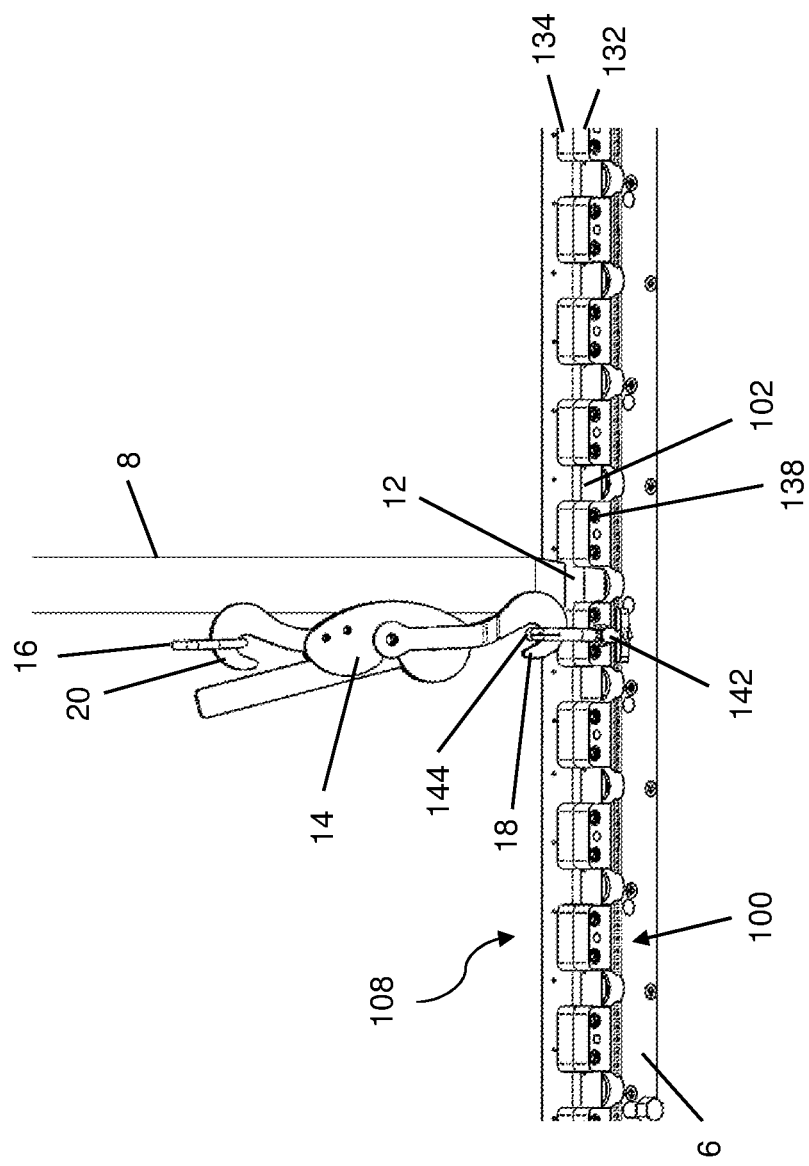
FIG. 2 illustrates an exemplary lashing anchor connection in the rapid release interface assembly incorporating aspects of the disclosed embodiments.

Referring also to FIG. 2, the rapid release interface assembly 100 is configured to secure the two ends of the lashings 8. Only one end of the lashing 8 with a loop member 12 is shown in the example of FIG. 1. The end of the lashing 8 not shown in FIGS. 1 and 2 includes a D-ring member 16. As shown in the example of FIG. 2, a load binder 14 is used to connect the D-ring member 16 to the rapid release interface assembly 100.

The loop member 12 is configured to engage a pin member 102 of the rapid release interface assembly 100, as will be further described herein. The loop member 12 replaces the D-ring that might be found on that end of a typical lashing used in conjunction with airdrop platforms.

In one embodiment, the loop member 12 comprises a cylindrically shaped portion or member that is configured to receive the pin member 102. The loop member 12, also referred to as an eye loop, can be sewn into the lashing 8. In alternate embodiments, the loop member 12 is any suitable device that is configured to securely engage with and secure the end of the lashing 8 to the pin member 102, as is generally described herein.

In the example of FIG. 2 the pin member 102 is shown in an extended position. The pin member 102 extends into and through the opening of the loop member 12. In this manner, the respective end of the lashing 8 is secured to the rapid release interface assembly 100. When the pin member 102 is moved to the retracted position, as will be further described herein, the pin member 102 slides out of the opening of loop member 12, and the respective end of the lashing 8 is released. In this manner, the loop member end of the lashing 8 is quickly and easily released to an unsecured, or otherwise free state.

In one embodiment, a diameter of the opening of the loop member 12 is approximately six (6) inches. In alternate embodiments, the opening of loop member 12 can have any suitable diameter to satisfy the particular airdrop application and the diameter of the pin member 102.

Although only one pin member 102 and one lashing 8 will be generally referred to herein, the aspects of the disclosed embodiments are not so limited. It will be understood that the airdrop platform 10 can accommodate any suitable number of lashings 8, while the rapid release interface assembly 100 can include any suitable number of pin members 102. The rapid release interface assembly 100 is modular in nature and can be configured to accommodate any airdrop platform length. For example, the rapid release interface assembly 100 can be constructed in four foot and eight foot lengths in order to accommodate current airdrop platform sizes. In alternate embodiments, the rapid release interface assembly 100 can have any suitable size and length, with a corresponding number of pin members 102.

Figure 3:
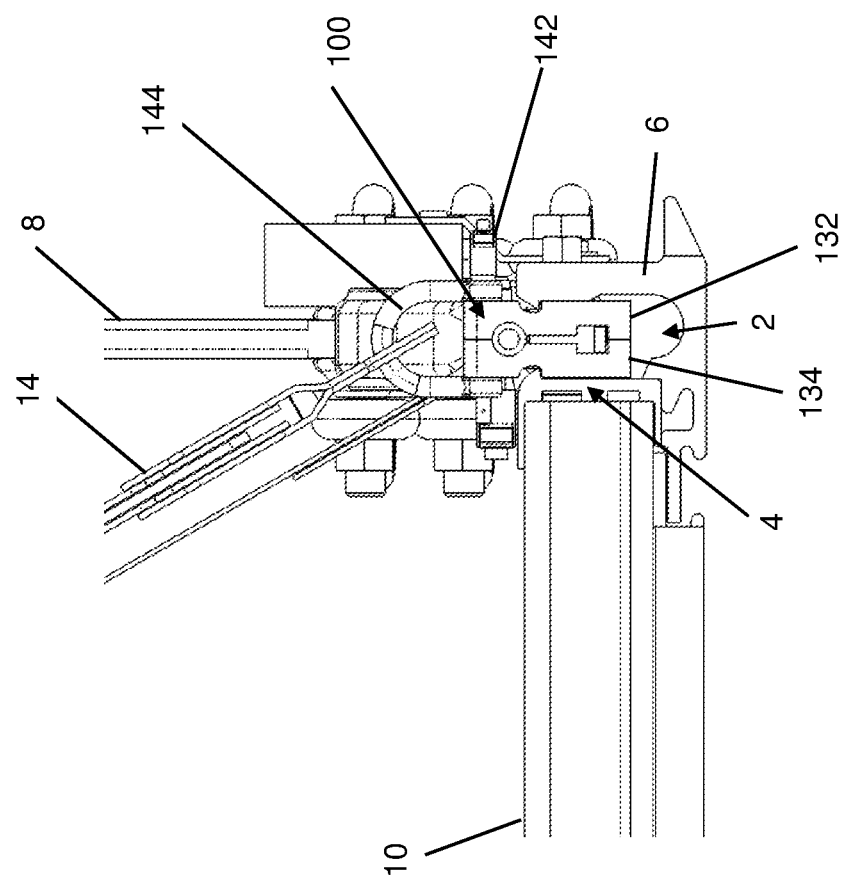
FIG. 3 illustrates an end view of an exemplary rapid release interface assembly incorporating aspects of the disclosed embodiments installed on an airdrop platform.

The aspects of the disclosed embodiments allow for an existing airdrop platform to be modified to incorporate the rapid release interface assembly 100. FIG. 3 illustrates an end view of the airdrop platform 10, at the side rail 6. In this example, the rapid release interface assembly 100 is disposed in a channel 2 of the air drop platform 10, between an end member 4 and the side rail 6. In the typical airdrop platform, the channel or channel region 2 would otherwise form the platform bushings where devises for the airdrop platform would be attached.

By disassembling the end member 4 from the side rail 6 of an existing airdrop platform, the bushing and clevis assemblies can be removed. The rapid release interface assembly 100 can then be inserted in the channel 2 and secured between the end member 4 and the side rail 6. Alternatively, the rapid release interface assembly 100 can be integrally formed with newer designs of airdrop platforms.

Figure 4:
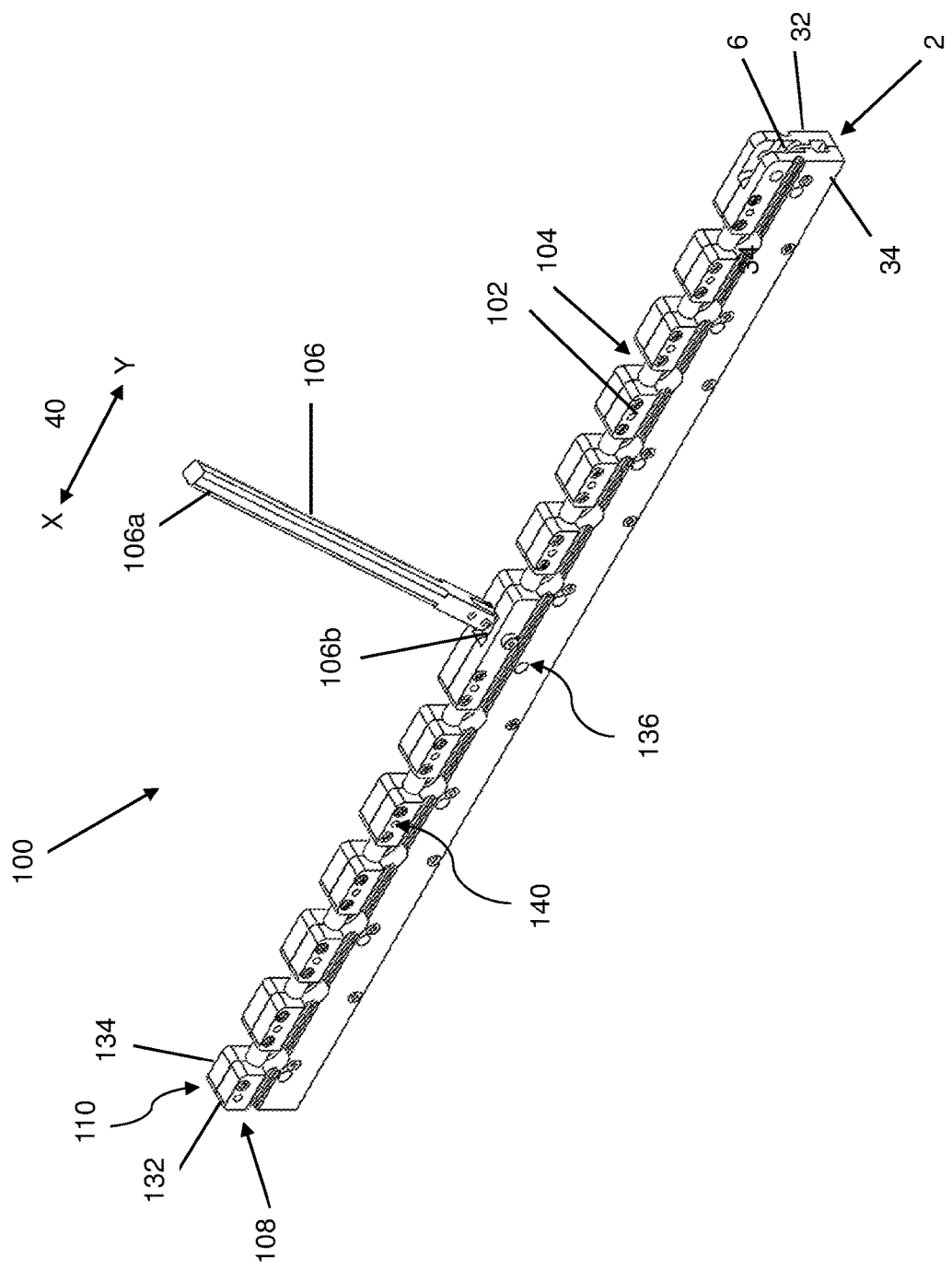
FIG. 4 illustrates aspects of an exemplary latching mechanism for the rapid release interface assembly incorporating aspects of the disclosed embodiments.

FIG. 4 illustrates an example the rapid release interface assembly 100 incorporating aspects of the disclosed embodiments without the lashings installed. In this example, the pin members 102 are in the extended state or closed position. In the extended state, the pin members 102 extend across respective pin member openings 104, also referred herein to as a notch or notches. The loop member 12 of the lashing 8 is configured to be positioned and received in the notch 104. The pin member 102 is configured to engage the opening in the loop member 12 when the loop member 12 is disposed in the notch 104.

As is shown in FIG. 4, the rapid release interface assembly 100 includes a lever or handle member 106. The lever 106 is configured to be moved in directions X-Y as illustrated by arrow 40. When moved in one direction, the lever 106 is configured to cause the pin members 102 to move across the notch 104 to the extended or closed state. Moving the lever 106 in the other or opposite direction is configured to cause the pin members 102 to move to the retracted or open state. In the retracted or open state, the notch area 104 is generally free of the pin member 102. The loop member 12 and the corresponding lashing 8 are easily secured and unsecured with a single action of the lever 106.

In the example of FIG. 4, the lever 106 is disposed in or on an approximate center region of the rapid release interface assembly 100. Centering the lever 106 on the assembly 100 enables a balancing of the loads to the front and rear of the rapid release interface assembly 100.

In one embodiment, there is one lever 106 per side of the airdrop platform 10, the lever 106 being associated with a respective rapid release interface assembly 100. In alternate embodiments, the airdrop platform 10 can include more than one rapid release interface assembly on one or more of the sides of the airdrop platform 10. The number of rapid release interface assemblies 100 on a side of the airdrop platform 10 can depend on a length of the side of the platform, Typical lengths for the rapid release interface assembly 100 can include, but are not limited to, four (4) feet and eight (8) feet lengths. Thus, where the length of a side of the platform 10 is eight (8) feet, a single eight (8) foot rapid release assembly 100 with a single lever 106 can be used.

In the example of FIG. 1, the length of the side 1002 of the platform 10 is twelve (12) feet and there are two rapid release interface assemblies 100a, 100b along the one side 1002. The assembly 100a is a four (4) foot length assembly and the assembly 100b is an eight (8) foot length assembly. Each assembly 100a, 100a has their own lever 106. In this manner, the time to release or free all of the lashings 8 that may be associated with the airdrop platform 10 is significantly reduced.

The modular design of the system enables construction of four (4) foot and eight (8) foot lengths to easily accommodate current airdrop platform sizes. Each length or section of the rapid release interface assembly 100 can have its own lever 106. Alternative, the different lengths can be linked together to a common lever 106 to minimize the number of levers per platform size.

Figure 5:
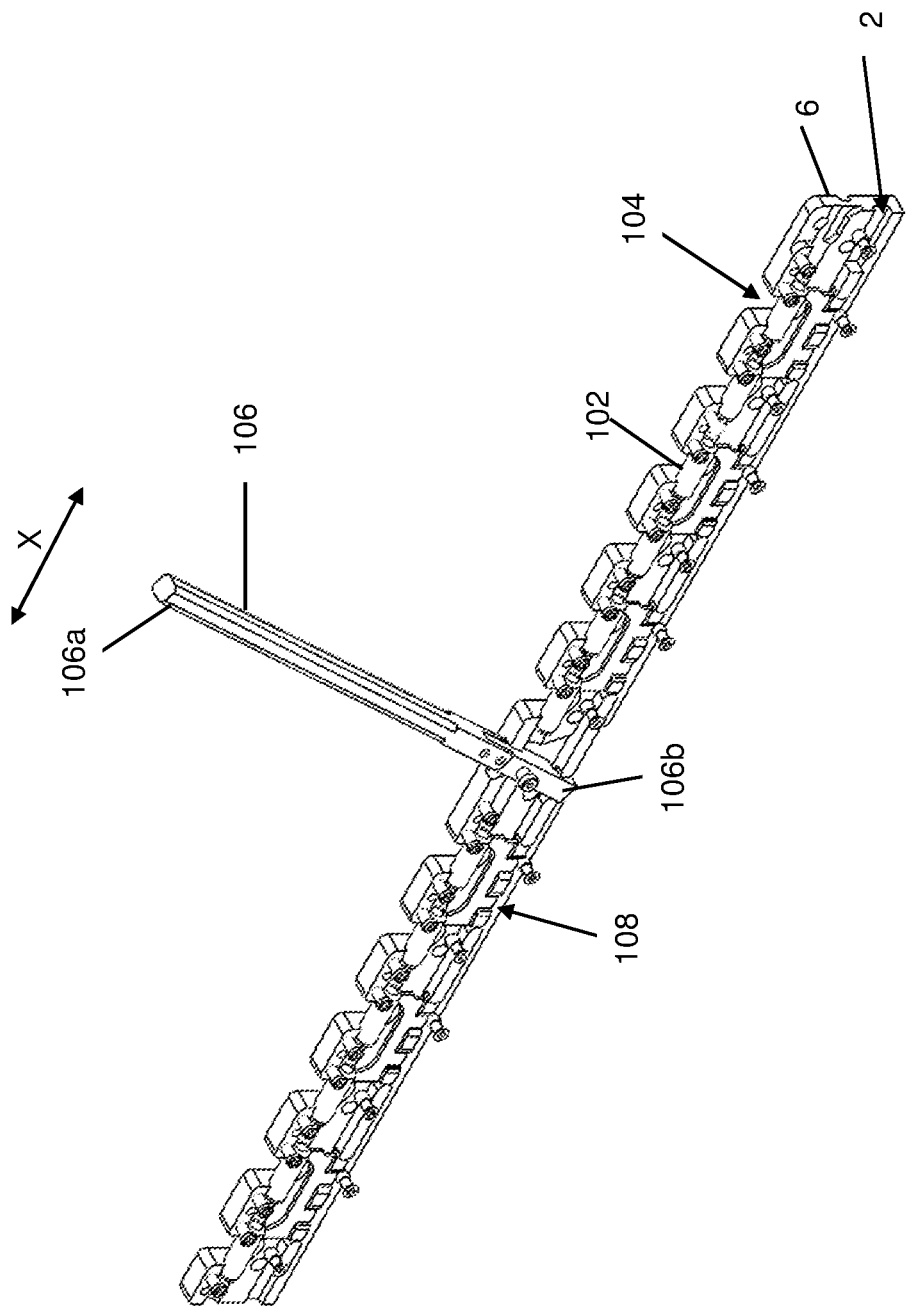
FIG. 5 illustrates the internal elements of the exemplary latching mechanism of FIG. 4.
Figure 6:
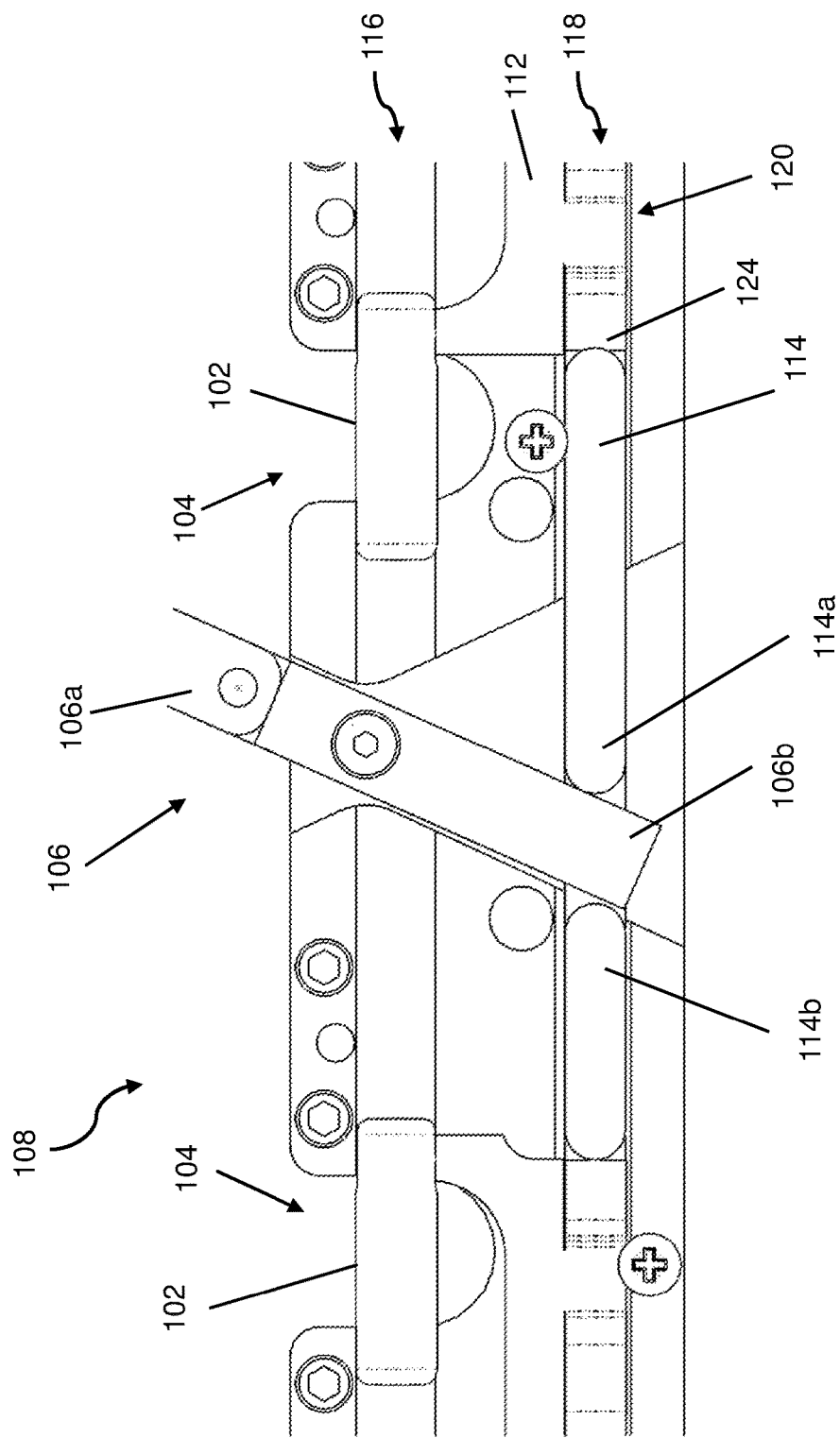
FIG. 6 illustrates the interface of the lower portion of the lever with the drive rod of the rapid release interface assembly for the rapid release interface assembly incorporating aspects of the disclosed embodiments.

Referring to FIGS. 4-6, in one embodiment, the lever 106 can include an upper lever or member 106a and a lower lever or member 106b. Although the aspects of the disclosed embodiments are described herein with respect to an upper member 106a and a lower member 106b, the aspects of the disclosed embodiments are not so limited. In one embodiment, the lever 106 comprises a single member. When the lever 106 comprises two separate members 106a, 106b, the two members can be connected or secured together in order to operate the lever 106 as is generally described herein. In one embodiment, when disengaged, the two members 106a, 106b may still be linked or may be fully separable. Being maintained linked prevents the opportunity for one member to be lost.

For example, during an airdrop, it can be desirable or advantageous to disengage the upper lever member 106a from the lower lever member 106b and store the upper lever member 106a for safety purposes. In one embodiment, the upper lever member 106a can be secured to the platform 10.

In the example of FIG. 4, the upper lever member 106a is in a functional position. In this position, the upper lever member 106a is removably engaged with the lower lever member 106b. In one embodiment, the connection between the upper lever member 106a and the lower lever member 106b is a snap-fit or snap-pin connection. In alternate embodiments, any suitable connection mechanism or device can be used to removably connect and secure the upper lever member 106a to the lower lever member 106b. As will be described below with respect to FIG. 6, the lower lever member 106b is configured to interact with a driving rod 114 that is configured to move or drive the pin members 102 between the extended and retracted states, as is described herein.

Figure 7:
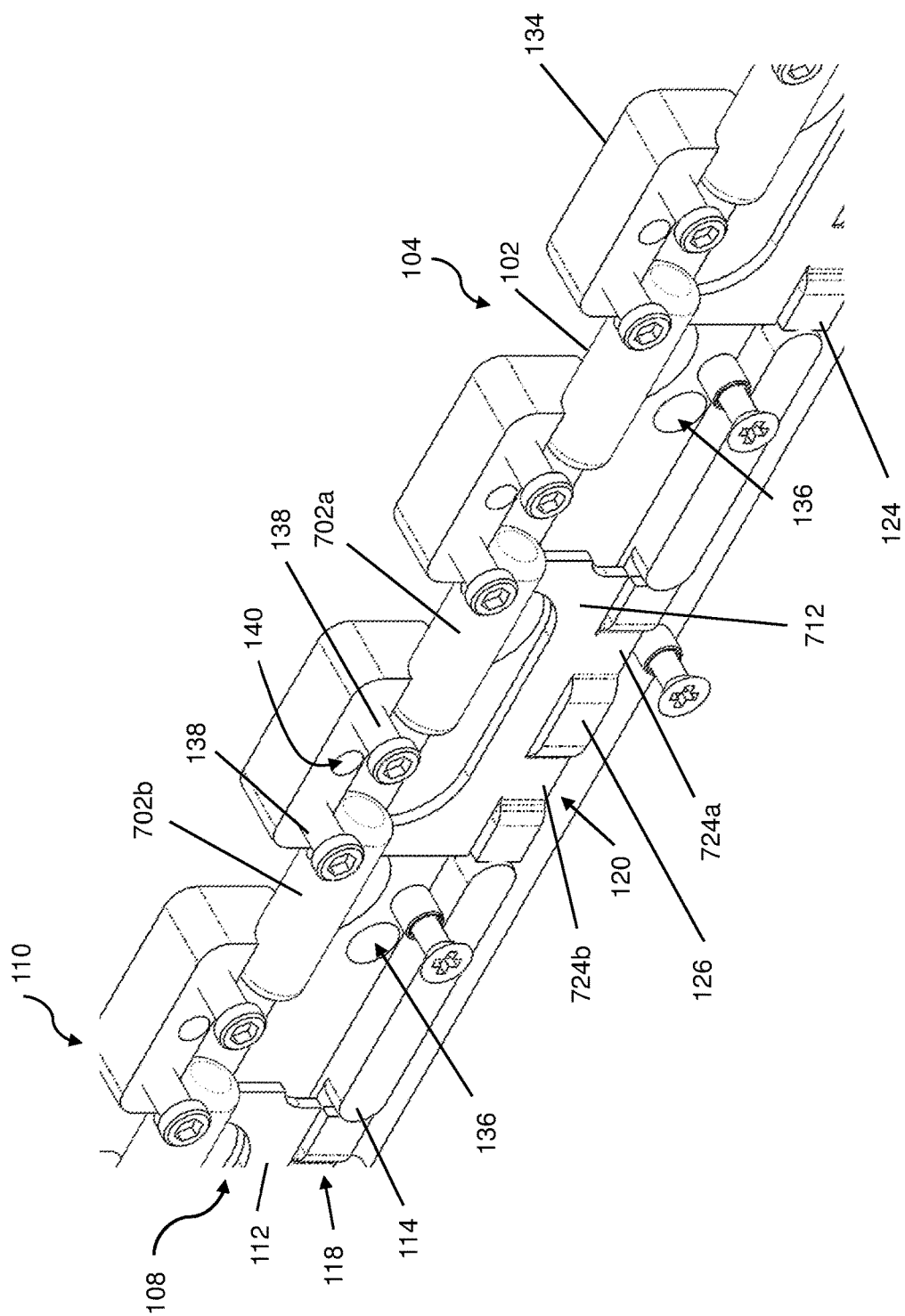
FIG. 7 illustrates aspects of the internal mechanisms of the drive rod, shuttle, and pin arrangement of the rapid release interface assembly for the rapid release interface assembly incorporating aspects of the disclosed embodiments.

Referring to FIGS. 4-7, the aspects of the disclosed embodiments include a pin driving mechanism or assembly 108 that is configured to drive the pin members 102 between the extended and retracted state, responsive to the movement of the lever 106. Referring to FIGS. 4 and 7, the body 110 of the pin driving assembly 108 is composed of an extrusion that is formed from two lengthwise halves 132, 134. The example of FIGS. 5, 6 and 7 illustrates the body 110 with the outer body half 132 removed.

Referring to FIG. 6, in one embodiment, the pin driving assembly 108 includes four (4) primary components. These primary components include the pin members 102, shuttles 112, drive rod 114 and lever 106. The pin members 102 move or slide along a channel 116 within the body 110. The lever 106 is configured to motivate the pin members 102 into the open and closed positions.

The lever 106 is configured to interface with the drive rod 114. The drive rod 114 is a long member that is positioned within channel 118. The channel 118 is fabricated into the two halves of the body 110. The drive rod 114 is configured to drive the pin members 102 when the lever 106 is repositioned.

As shown in FIG. 6, the lower end 106b of the lever 106 is disposed between two drive rod portions 114a and 114b In one embodiment, the lever 106 is pivotally mounted so the lower end 106b of the lever 106 can push the drive rod 114 in one direction or another. The pin member channel 116 allows the pin members 102 to slide longitudinally along the pin driving assembly 108. Co-located with each pin member 102 is the notch 104 in the body 110. Movement of the lever 106 and the drive rod 114 repositions the pin members 102 across the notches 104. When the drive rod 114 is extended, the pin member 102 fully spans the notch 104 allowing a loop member 12 of a lashing 8 to be restrained. Retracting the pin member 102 opens the notch 104 and releases the lashing 8.

Referring also to FIG. 7, located along the drive rod 114 are shuttles or shuttle members 112. The shuttle 112 acts as the interface between the drive rod 114 and the pins 102. In one embodiment, there are two (2) pins 102 per shuttle 112. In FIG. 7, an exemplary shuttle is labelled as shuttle 712, while the respective pins for shuttle 712 are labelled as pins 702a and 702b. As shown in FIG. 7, pin 702a is connected to one end of the shuttle 712, while pin 702b is connected to the other end of shuttle 712.

Referring to FIG. 6, in one embodiment, the drive rod 114 includes one or more indents 120, also referred to herein as openings or slots 120. Each indent 120 is configured to receive a respective tab member 124 of the shuttle 112. When the tab members 124 are disposed in the indents 120, the respective shuttle member 112 is connected to the drive rod 114. This, in turn connects the drive rod 114 to the pin members 102 of that shuttle member 112. In the example of FIG. 7, the exemplary shuttle 712 includes tab members 724a and 724b. Tab members 724a and 724b are shown disposed within a respective indent 120 of the drive member 114. Movement of the drive rod 114 will cause the shuttle 712 to move. This, in turn, moves the pin members 702a and 702b. Although the use of tab members 124 to connect the shuttle 112 to the drive rod 114 is described herein, the aspects of the disclosed embodiments are not so limited. In alternate embodiments, any suitable manner of connecting the shuttle 112 to the drive rod 114 can be implemented.

In the example of FIG. 7, the drive rod 114 has a substantially square cross-section. In alternate embodiments, the cross-section of the drive rod 114 can be any suitable geometric configuration. For example, in one embodiment, the cross-section of the drive rod 114 is circular. In another embodiment, the drive rod 114 is a wire rope with swaged/crimped fittings. In this embodiment, the tab members 124 of the shuttle 112 will be suitably connected to the wire rope.

Referring to FIG. 7, the shuttles 112 include one or more details 126 that are configured to enable the shuttle 112 to be retained within the channel 118. The details 126 enable the shuttle 112 to maintain alignment with the drive rod channel 118.

When both sidewalls or halves 132, 134 of the body 110 are installed, the sidewalls 132, 134 will restrict the longitudinal motion or movement of the loop member 12 of the lashing 8. The loop member 12 of the lashing 8 engages with the pin member 102 when the pin member 102 spans the notch 104. When the pin member 102 is retracted and the notch 104 open, the loop member 12 of the lashing can be dropped into the notch 104. The restriction of the longitudinal movement of the loop member 12 allows the pin members 102 to slide out of the loop member 12 when the drive rod 114 is moved to the retracted position.

During use, the two sidewalls 132, 134 of the body 110 are joined together. In the example shown in FIG. 7, fasteners 138, such as screws, are used to join the two sidewalls 132, 134 together. In alternate embodiments, any suitable securing mechanism or fastener can be used to join and secure the two sidewalls 132, 134 together other than including screws.

In the examples of FIGS. 4 and 7, there are unoccupied holes 136, 140 in the sidewall 134 of the body 110. The first set of holes 136 are located just above the drive rod channel 118 and are used to secure the body 110 to the platform 10. The first set of holes 136 can be referred to as platform securement holes.

As shown in FIG. 7, two paired fasteners 138 surround a second hole 140. The holes 140 are configured to accommodate a quick release pin 142 securing a clevis 144, as is illustrated in FIGS. 2 and 3.

FIGS. 2 and 3 illustrates how the lashing 8 is installed in the rapid release interface assembly 100. In this example, both sidewall members 132, 134 are secured together by the screws 138. The loop member 12 of the lashing 8 is secured by the pin member 102. The other end of the lashing 8 interfaces with a load binder 14 and a D-ring 16.

As shown in FIG. 2, one end 18 of the load binder 14 is configured to engage with the clevis 144. In one embodiment, the clevis 144 is secured to the body 110 of the pin driving assembly 108. In the example of FIG. 3, the quick release pin 142 is used to secure the clevis 144 to the body 110. The use of the clevis 144 and quick release pin 142 will permit rapid relocation of lashings 8 when necessary.

The other end 20 of the load binder 14 shown in FIG. 2 is configured to engage with the D-ring 16, which is attached to the other end (not shown) of the lashing 8, away from the loop member 12. The lashing 8 can also engage with one or more provisions on the platform 10 and the payload to ensure that the payload is secured to the platform 10.

In one embodiment, the rapid release interface assembly 100 is configured to directly integrate into the Type V airdrop platform 10 of FIG. 1. As shown in FIG. 1, the large box 22 forward of the levers 106 is the extraction force transfer coupling actuator. This actuator 22 is the legacy Type V mechanism to trigger the deployment of the main canopies after the load has left the aircraft.

Figure 8:
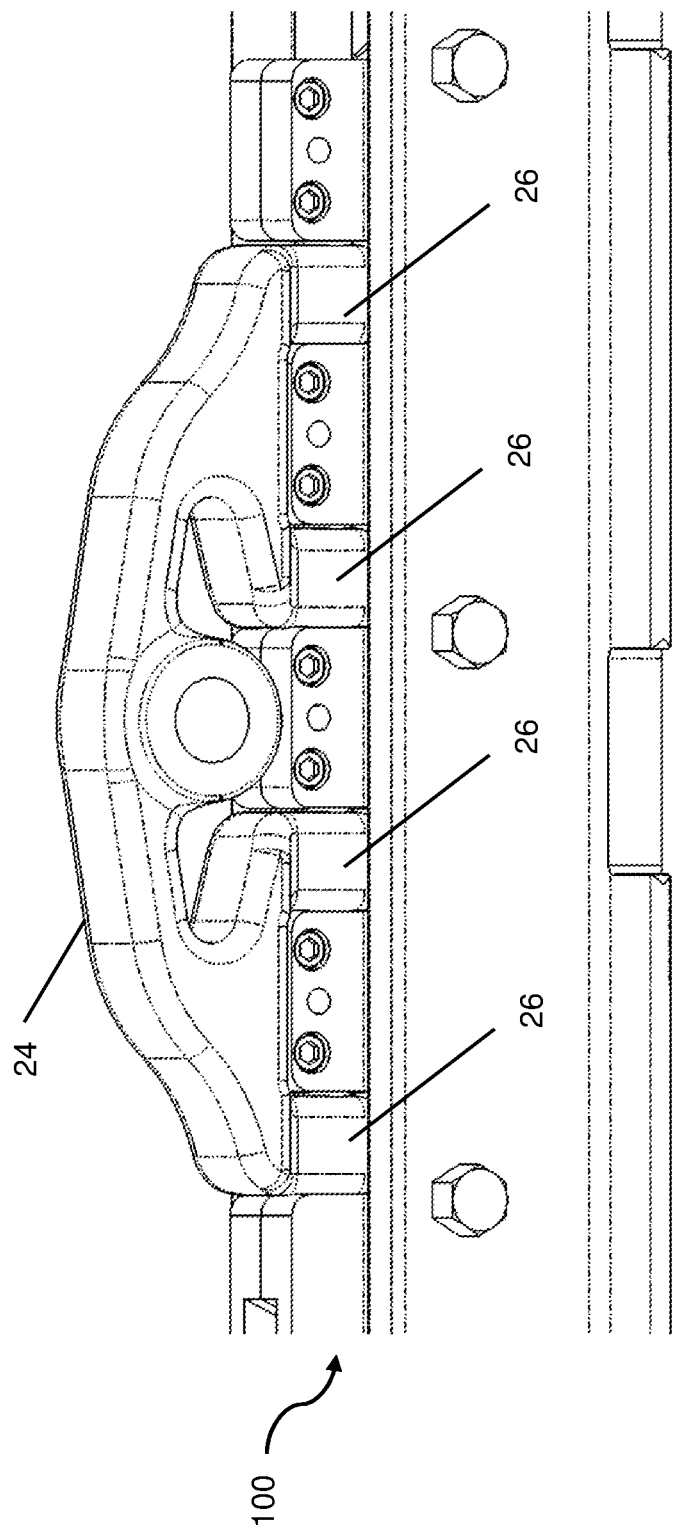
FIG. 8 illustrates an exemplary airdrop suspension link installed on a rapid release interface assembly incorporating aspects of the disclosed embodiments.

The rapid release interface assembly 100 is also configured for easy placement and removal of provisions such as airdrop suspension provisions and emergency restraint provisions. FIG. 8 illustrates an exemplary airdrop suspension link 24 that can be used with the rapid release interface assembly 100 of the disclosed embodiments. In airdrop, suspension slings connect the load to the parachutes. The airdrop suspension links 24 are the anchor points on the load for the slings when the airdrop load is platform suspended.

The suspension link 24 shown in FIG. 8 is configured to interface with pin members 102 of the Rapid release interface assembly 100. As shown in FIG. 8, pin receiving or engaging members 26 of the suspension link 24 are configured to be received in the notches 104, shown in FIG. 4, for example. The pin engaging members 26 will include pin receiving apertures (not shown) that are configured to receive respective pin members 102. In the extended or closed state of the pin members 102, the suspension link 24 is securely retained in the rapid release interface assembly 100. In the retracted or open state of the pin members 102, the suspension link 24 can be easily removed. This allows for quick and easy removal of the suspension link 24 after an airdrop or relocating the position of the suspension link 24 during rigging. FIG. 1 also illustrates an exemplary suspension link 24 disposed in the rapid release interface assembly 100 for the platform 10.

In the example of FIG. 8, the suspension link 24 includes four pin engaging members 26. In alternate embodiments, the suspension link 24 can include any suitable number of pin engaging members 26, other than including four.

Figure 9:
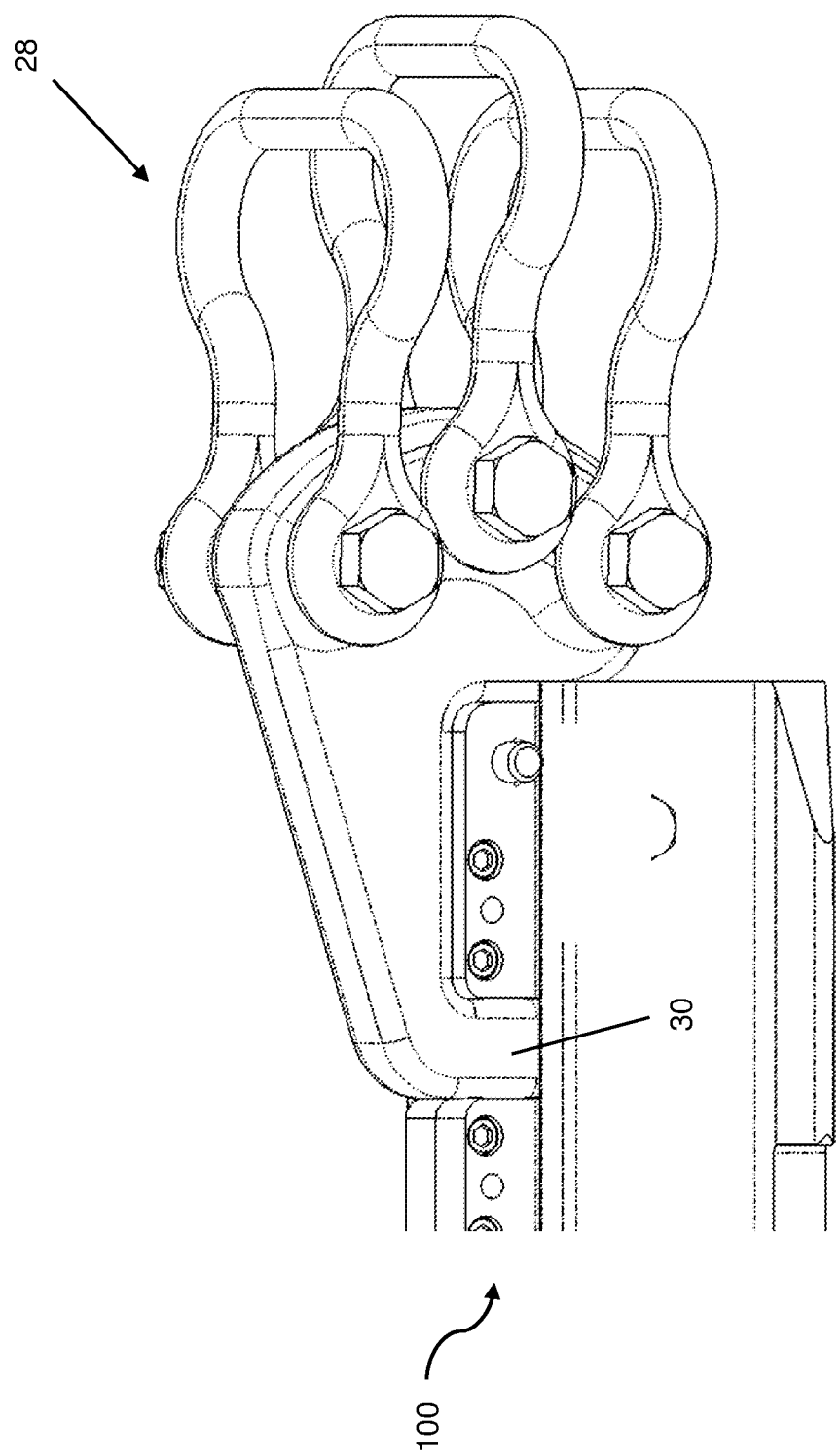
FIG. 9 illustrates an exemplary emergency restraint provision installed on rapid release interface assembly incorporating aspects of the disclosed embodiments.

FIG. 9 illustrates an example of an emergency restraint provision 28 that can be used with a rapid release interface assembly 100 of the disclosed embodiments. Some platform airdrop requirements include chaining the airdrop platform 10 in place during emergency situations. The emergency restraint provision 28 illustrated in FIG. 9 allows for the installation of three (3) medium airdrop devices to accommodate the chain restraint procedure.

The emergency restraint provision 28 shown in FIG. 9 is configured to interface with pin members 102 of the rapid release interface assembly 100. As shown in FIG. 9, pin engaging members 30 of the emergency restraint provision 28 are configured to be received in the notches 104. The pin engaging members 30 will include pin receiving apertures (not shown) that are configured to receive respective pin members 102. In the extended or closed state of the pin members 102, the emergency restraint provision 28 is securely retained in the rapid release interface assembly 100. In the retracted or open state of the pin members 102, the emergency restraint provision 28 can be easily removed. This allows for quick and easy removal of the emergency restraint provision 28 or relocating the position of the emergency restraint provision 28. FIG. 1 also illustrates exemplary emergency restraint provision 28 disposed in the platform airdrop assembly 1.

For rigging, the eye end or loop member 12 of a lashing 8 will be placed into a recess or notch 104 behind a pin member 102. The pin members 102 of the rapid release interface assembly 100 will then be closed to secure the loop member 12. The other or free end of the lashing 8 will be routed through the tiedown points on the airdrop item or payload, and then back to the starting position on the platform 10. The free end of the lashing will have a D-ring 16 installed and is anchored to the rapid release interface assembly by a load binder 14 as illustrated in FIG. 2.

Once the air drop platform 10 is dropped, the lashings 8 will loosen due to compression of the energy dissipating material. For example, an energy absorbing material of the airdrop platform 10, such as paper honeycomb, crushes. The differential distance between the payload and the platform 10 is much smaller than it was, and the lashings 8 are all loose, or there is slack in all of them.

During derigging or removal of the payload from the platform 10, the one end of the lashing 8 with the D-ring 16 remains anchored, while the other end of the lashing 8 with the loop member 12 (without the D-ring) slips free. Since all of the pin members 102 of the rapid release interface assembly 100 on the platform 10 are linked to a single pull lever 106, pulling on the lever 106 moves the pin members 102 to the retracted position and releases the respective loop members 102 of the lashings 8. The ends of the lashing 8 with the loop members 12 are freed. The load binders 14 do not need to be removed and the lashings 8 do not need to be pulled free in order to free the payload from the platform 10. The lashings 8 are then easily and quickly removed from the payload. The rapid release interface assembly 100 allows the payload to be quickly removed from the platform 10 without the need to manually disengage each of the ends of the lashing 8.

The aspects of the disclosed embodiments provide a system that allows for derigging lashings of an airdrop platform with one action. The use of the Type V platform devises and the sewn in D-ring from one of the end of a lashing is eliminated. An eye loop member replaces the D-ring at the one end of the lashing. A rapid release interface system is installed in the space between the platform side rail and panel end members. The pins will slide through the lashing eye loops to secure the end of the lashing to the rapid release interface system. With all of the pins on a common drive, the pins are all opened and closed together, or at the same time. In this manner, the one end of the lashing can be secured or released with one action.

While there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus comprising:
    an airdrop platform;
    a rapid release interface assembly secured in a channel along a side of the airdrop platform, the rapid release interface assembly comprising a movable pin member that is configured to move between an extended position and a retracted position;
    a lashing configured to tie down a payload to the airdrop platform, one end of the lashing comprising a loop member, wherein the movable pin member is configured to engage the loop member in the extended position and release the loop member when in the retracted position.

2. The apparatus according to claim 1, wherein the rapid release interface assembly is disposed between an end member of the airdrop platform and a side rail of the airdrop platform.

3. The apparatus according to claim 1, wherein the loop member comprises a cylindrical member configured to receive the pin member of the sliding pin lock assembly.

4. The apparatus according to claim 1, wherein the sliding lock assembly further comprises a notch region, the notch region configured to receive the loop member of the lashing and the pin member when the pin member is in the extended state.

5. The apparatus according to claim 1, further comprising a lever, the lever being configured to move the pin member between the extended position of the pin member and the retracted position of the pin member.

6. The apparatus according to claim 5, wherein the lever is disposed in a center region of the rapid release interface assembly.

7. The apparatus according to claim 6, wherein the lever comprises a first lever member that is connected to the rapid release interface assembly and a second lever member that is removably connected to the first lever member, the second lever member configured to be engaged by a user to move the lever between the extended position and retracted position of the pin members 102.

8. The apparatus according to claim 1, wherein the sliding pin lock assembly further comprises a pin driving assembly that is configured to move the pin members between the extended state and the retracted state, the pin driving assembly comprising:
    a shuttle member, the shuttle member being connected to the pin member;
    a drive rod disposed within a channel of a body of the pin sliding pin lock assembly, the shuttle member being connected to the drive rod and configured to move with the drive rod; and
    a lever, the lever being connected to the drive rod and configured to move the drive rod.

9. The apparatus according to claim 8, wherein the drive rod includes one or more indents, the shuttle members being received in the indents.

10. The apparatus according to claim 1, further comprising a clevis secured to a body of the rapid release interface assembly.

11. The apparatus according to claim 1 further comprising an airdrop suspension link removably connected to the rapid release interface assembly, the airdrop suspension link comprising one or more pin receiving members that are configured to receive corresponding pin members of the rapid release interface assembly.

12. The apparatus according to claim 1, wherein the rapid release interface assembly comprises a plurality of movable pin members disposed in respective notch regions of the rapid release interface assembly, a loop member of a corresponding lashing configured to be received within the respective notch region.

13. The apparatus according to claim 12, further comprising a lever connected to the rapid release interface assembly, the lever configured to move the plurality of movable pin members between the extended state and the retracted state.

* * * * *